April 9, 1946.  N. W. HARTZ  2,397,962
REMOTE INDICATING MEANS
Filed June 3, 1943  2 Sheets-Sheet 1
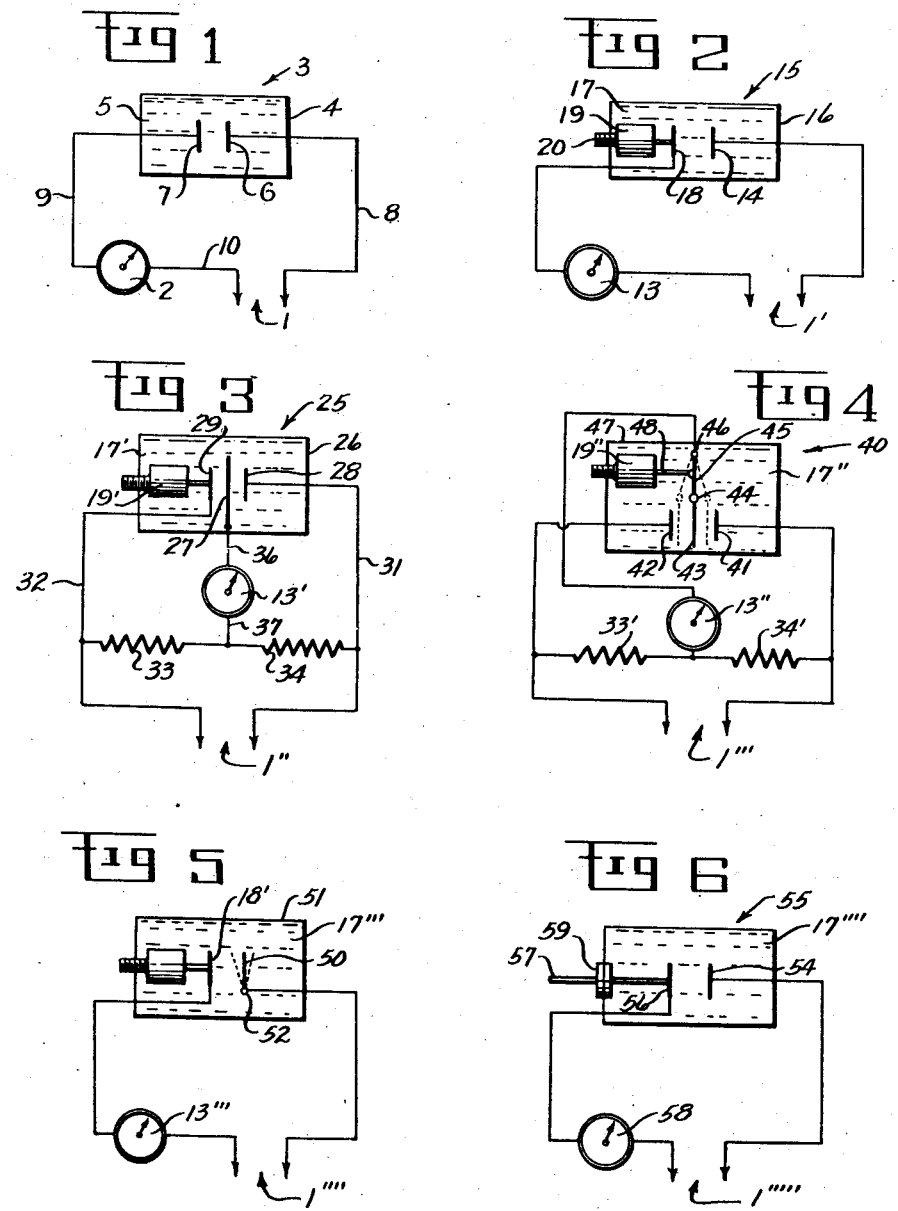
INVENTOR
NELSON W. HARTZ
BY
ATTORNEYS

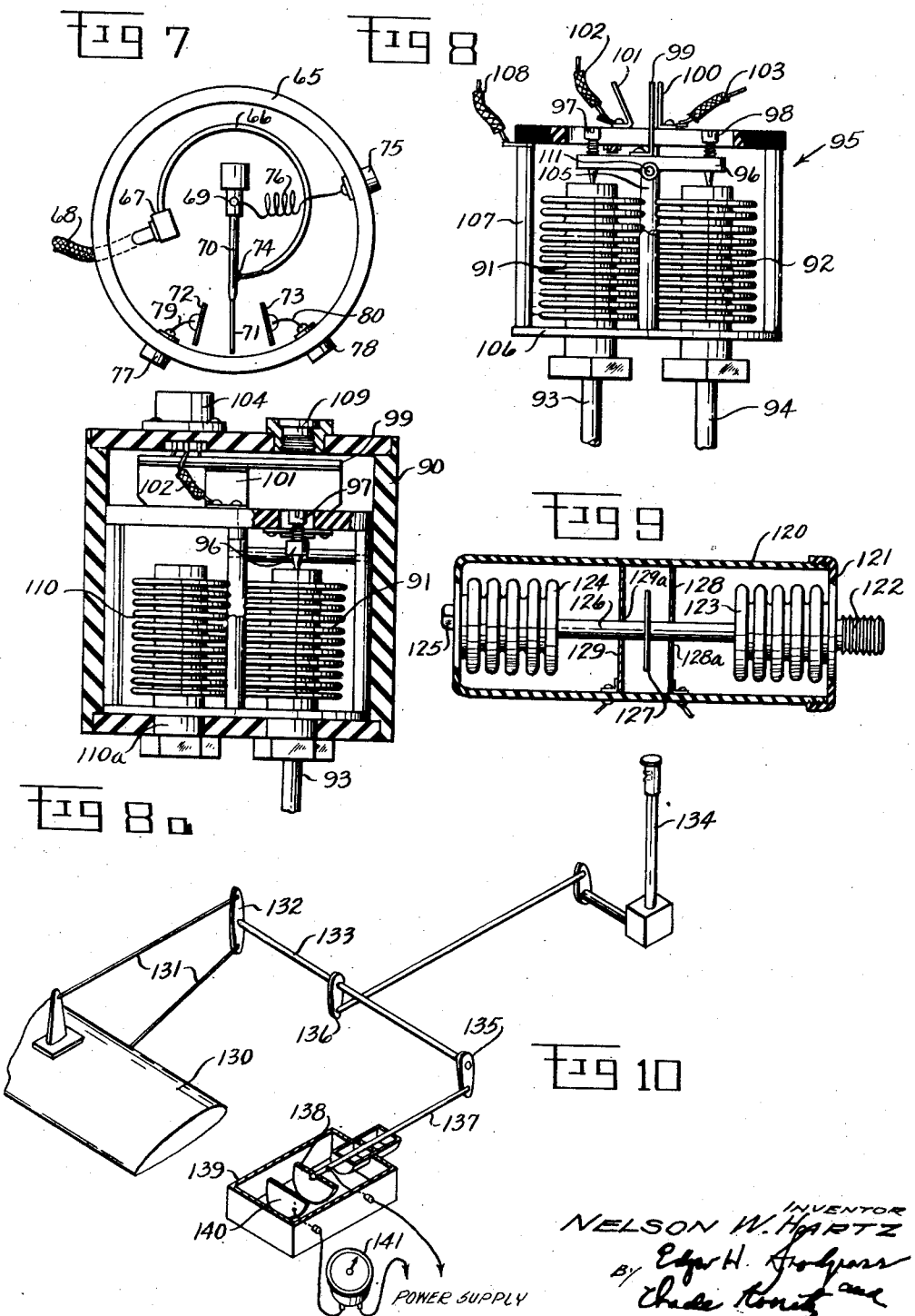

Patented Apr. 9, 1946

2,397,962

UNITED STATES PATENT OFFICE 2,397,962

REMOTE INDICATING MEANS

Nelson W. Hartz, Pittsburgh, Pa.

Application June 3, 1943, Serial No. 489,481

9 Claims. (Cl. 201—57)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to remote indicating systems for transmitting to a remote station the indication of a condition existing at an originating station and particularly to such systems designed for use in aircraft such as for remote indication of temperature, fuel and oil pressure, fuel liquid level, landing gear and control surface position, and sundry similar purposes.

A primary object of the present invention is to provide an improved remote indicating system of the general class described wherein certain provisions are made for overcoming disadvantages of present systems involving instability due to vibration factors present in aircraft operation, interference with proper operation due to extreme variations in the temperature range to which instruments are subjected in aircraft operation, and other factors mentioned more in detail hereinafter.

Remote indicating systems at present employed in aircraft fall into three general classifications. One classification involves the type of system in which direct pressure connection is employed between the indicator instrument and the factor desired to be indicated. Such systems usually avail of a fluid pressure transmitting medium through fluid conduits. These are subject to malfunctioning at extreme temperatures or due to breaks or leakage in the conduits.

Another classification involves the alternating current Selsyn type remote indicating system wherein an electric motor operates the indicator at a point remote from, and in response to, corresponding variations in a controlling electric motor at the location of the factor desired to be indicated. These systems have certain advantages but in general are complicated and expensive.

A third classification involves the systems utilizing an electric circuit employing current or voltage responsive indicator means in which the varying physical force of the factor desired to be indicated is caused to vary the resistance in the circuit to produce a corresponding variation in the current responsive indicating means at the remote location. The present invention relates more particularly to the latter class of remote indicating systems.

In the latter type of system a variable resistance, comprising a slide wire rheostat or potentiometer is usually employed in conjunction with a pressure responsive means such as a piston and cylinder, Bourdon tube, or bellows to vary the contact position of the rheostat or potentiometer. Such an instrumentality, comprising a variable resistance and pressure responsive means for varying the same, is referred to herein as a transmitter or transmitting means. The types of such transmitters heretofore used involving the slide wire or bimetal resistance are subject to certain disadvantages peculiar to the operational conditions in remote indicating systems for use in aircraft. These operational conditions involve vibration as it affects instability of electrical systems including variations in indicator reading due to such vibration; vibration as it affects wear of the contact member of the rheostat upon the wirewound resistance causing an uneven variation in the resistance on account of the resulting uneven pressure of the contact member with respect to the wire; friction due to the sliding contact and due also to congealing of the lubricant; and malfunctioning due to the effects of temperature change. The metal resistance members are also subject to corrosion which results in malfunctioning. These factors result in inaccurate indicator reading and uncertainty of operation in reference to the use of this type of remote indication system.

It is an object of the present invention to provide a remote indicating system and a transmitting means for use therein, which overcome the disadvantages above mentioned and yet which are simple in construction and inexpensive to manufacture, positive in operation and substantially unaffected by vibration and temperature conditions encountered in aircraft operation.

The basic concept of the present invention involves the employment, in a remote indicating system of the class described, of a transmitting means comprising a variable resistance, including a liquid conductor in the electrical telemetering circuit and means responsive to physical conditions external to said circuit for varying the resistance thereof. In the embodiments of the invention herein disclosed the electrical telemetering circuit includes a source of current and current responsive indicator means in said circuit. The transmitting means comprises a resistance in said circuit variable in response to a physical condition external to said circuit, said resistance comprising a liquid conductor.

According to the disclosure, the transmitting means preferably comprises a body of electrically conductive liquid maintained in a substantially static condition, and spaced solid electrical conductors permanently immersed in the body of liquid. One of the conductors immersed in the liquid may be movable responsive to physical pressure external to the circuit by mechanical means or pressure responsive means including a piston and cylinder, Bourdon tube, bellows or other similar means. Provision is made for compensating for, or minimizing the effect of temperature variations in certain embodiments.

If the invention is to be used in embodiments wherein it is desired to maintain the indication constant regardless of variations in temperature, a liquid may be employed which has the characteristic of minimum change in resistivity with change in temperature. The effect of temperature in changing resistance of the liquid may also be dealt with, as disclosed, by employing an electrical bridge in the telemetering circuit wherein two arms of the bridge are each affected to a like degree by any change in resistance or conductivity of the liquid so that the effect of such change is minimized or nullified.

In order to maintain the body of liquid in a substantially static condition, a fluid tight container is provided therefor which is completely filled with the liquid, and pressure-compensating means is provided and designed to be actuated by expansion and contraction of the liquid to maintain the pressure of the liquid within the container substantially constant.

In order to obviate electrolytic decomposition of the liquid and solid conductors, an alternating current source is employed in the telemetering circuit of the remote indicating system of the invention.

Other objects, advantages and features of novelty will appear as the description of the invention proceeds in conjunction with the accompanying drawings, in which:

Figures 1 to 6 are diagrammatic views illustrating different modifications of the basic concept of the present invention.

Figure 7 is a view illustrating one form of transmitter of the invention utilizing a Bourdon tube as the pressure responsive means for effecting movement of the movable conductor member.

Figures 8 and 8A are views illustrating another form of transmitter of the invention embodying bellows means as the pressure-responsive means for effecting movement of the movable conductor.

Figure 9 is a view illustrating another modification of the transmitter of the invention.

Figure 10 is an isometric view illustrating the application of the invention to remote indication of airplane control surface position.

The primed reference characters represent corresponding elements in the several figures.

The fundamental principles of the invention are illustrated in Figures 1 to 6 to which reference is now made in detail. Figure 1 illustrates an embodiment of the invention as a thermometer or external temperature indicator, and in said figure the numeral 1 represents a source of alternating current; 2 indicates a current responsive indicating meter; and 3 generally indicates a transmitting means adapted to sense a physical condition external to the circuit and to affect the circuit so that the indicating means 2 will give an indication corresponding to the external physical condition desired to be indicated. In Figure 1 the transmitting means 3 comprises a container 4 within which is a body of electrically conductive liquid 5. Also within the container are the spaced solid electrical conductors 6 and 7 permanently immersed in the liquid 5. In this embodiment an electrical conductor comprising a wire 8 connects one side of the power source 1 with the electrical conductor 6 immersed in the liquid 5. Wire 9 connects the other electrical conductor 7 immersed in the liquid 5 with the current responsive indicator means 2; and wire 10 connects the indicator means 2 with the other side of the power source 1. Current flowing through the telemetering circuit including power source 1, liquid conductor 5, conductors 6 and 7 and indicator means 2, causes a deflection of the pointer of said indicator.

This embodiment contemplates the employment of a liquid 5 whose electrical conductivity changes with temperature so that the embodiment of Figure 1 will function as a thermometer. Changes in temperature will change the electrical resistance of the liquid 5 and the indicating meter 2 will be calibrated in temperature units to indicate the corresponding variations in temperature. Examples of liquids suitable for employment as the liquid body 5 in the embodiment of Figure 1, when the same is utilized as described to function as a thermometer, are aqueous solutions of sodium hydroxide and sulphuric acid as described more fully in the Dunmore Patent No. 2,210,903 of August 13, 1940.

Another adaptation of the basic concept is illustrated in Figure 2 wherein the transmitting means 15 comprises a container 16 wherein the liquid 17 is preferably a liquid having a minimum change in resistivity or conductivity with temperature. Spaced electrical conductors 14 and 18 are permanently immersed in the body of liquid 17, the conductor 14 being fixed as to location within the container 16 and the conductor 18 being movable within the container 16. For the latter purpose the conductor 18 is operatively connected to a pressure responsive means 19, such as a bellows of Sylphon or other suitable type, Bourdon tube, or the like, as shown. Pressure to be measured is applied to the bellows 19 through conduit connection 20.

In the operation of the system of Figure 2, pressure applied through connection 20 causes movement of the movable conductor 18, changing the length of the liquid conducting path between the conductors 18 and 14, consequently effecting a change in electrical resistance in the telemetering circuit resulting in a corresponding deflection of the pointer of indicating meter 13. The scale of the indicating meter 13 will be calibrated in terms of the pressure to be measured or the factor to be indicated such as, for instance, engine oil pressure, or fuel level, or the position of one of the aircraft control surfaces, or the position of the aircraft landing gear, or like factors, the pressure responsive means 19 being connected through a pressure line with means actuated by the factor to be indicated.

Figures 3 and 4 illustrate adaptations of the principles of the invention wherein the transmitting means incorporates two arms of a normally balanced electrical bridge, said two arms being arranged so that they are equally affected by, and compensate for, changes in applied voltage and ambient temperatures.

In the system illustrated in Figure 3, the transmitting means 25 comprises a container 26 within which the fixed conductors 27 and 28 and the movable conductor 29 are provided permanently immersed in the body of liquid conductor 17', the conductor 29 being movable by means of the pressure responsive means 19'. The conductors 28 and 29 are connected respectively with opposite sides of the current source through wires 31 and 32 respectively. Resistors 33 and 34 are connected in series across the current source and the indicating meter 13' is connected to the conductor 27 through wire 36 and to a point intermediate the resistors 33 and 34 by wire 37. It is thus seen that the arrangement of Figure 3 embodies an electrical bridge in which one arm is formed by the electrical path through the liquid conductor 17' between the conductors 27 and 29; another arm is formed by the electrical path through the liquid conductor 17' between the conductors 27 and 28; and other arms are formed respectively by the resistors 33 and 34.

The values of the resistors 33 and 34 are initially selected for a particular desired in-balance condition of the electrical bridge depending upon the initial desired positioning of the movable conductor 29.

In the operation of the embodiment illustrated in Figure 3, assuming that the electrical bridge incorporated therein is initially in balance, no current will flow from the current source and the pointer of the indicator 13' will remain at its initial zero position. Upon movement of the movable conductor 29 from its initial position wherein the bridge is in balance, the length of the liquid path between the conductors 29 and 27 will be altered so that the effective resistance of the liquid represented by the liquid path between the conductors 27 and 29 will be correspondingly varied to cause a corresponding deflection of the pointer of the indicator 13'.

Figure 4 discloses a system embodying an electrical bridge in which two arms thereof are incorporated in the liquid conductor in a manner similar to the system of Figure 3. In Figure 4, however, the transmitting means 40 avails of a construction in which the movable conductor 43 is located between the fixed conductors 41 and 42, said conductors being permanently immersed in the body of electrically conducting liquid 17''. The movable conductor 43, in this construction, is pivoted at 44 to a link 45 which in turn is pivoted as at 46 to the container 47. A link 48 pivoted to the link 45 is associated with the pressure responsive means 19''. The conductor 43 is pendulously suspended from pivot 44 so that the conductor 43 maintains a parallel relation to the conductors 41 and 42 when the conductor 43 is moved through actuation of the link 45.

The operation of the embodiment of Figure 4 is substantially comparable to the operation of Figure 3 except that the movable conductor 43 of Figure 4 is caused to move relative to its initial positioning intermediate the fixed conductors 42 and 41. The movement of the movable conductor 43 relative to its initial position wherein the bridge is in balance causes a simultaneous variation in the length of the liquid path between the movable conductor 43 and the fixed conductor 41 and in the length of the liquid path between the movable conductor 43 and the fixed conductor 42, likewise, to cause corresponding changes in the resistance of the respective liquid paths resulting in a corresponding deflection of the indicator 13''.

It will be apparent that in the systems of Figures 3 and 4 any changes in the applied voltage will not affect the bridge balance and any changes in the resistivity or conductivity of the liquid conductor 17' due to temperature variation, or other factors, will equally affect the two arms of the bridge which include said liquid conductor 17'. Thus temperature changes will be compensated for and will not affect the operation of the system.

The arrangement shown in Figure 5 is similar to Figure 2 except that, instead of the fixed conductor 14 utilized in Figure 2, a bimetallic conductor 50 is provided in Figure 5 which has one edge fixed to the container 51 as at 52, the element 50 being free to bend toward and away from the movable conductor 18' whenever the electrical conductivity of the liquid 17''' is changed due to a change in temperature. The bimetallic element 50 is so constructed and arranged that it will bend toward the conductor 18' and thereby reduce the liquid path between the conductors 18' and 50 when the conductivity of the liquid is decreased and the element 50 will bend away from the conductor 18' and thus increase the liquid path between the conductors 18' and 50 when the conductivity of the liquid 17''' increases. Thus, changes in the conductivity, and consequently the resistance, of the liquid 17''' in accordance with variations in temperature are compensated for by the use of the bimetallic element 50.

In Figure 6 the transmitting means 55 is adapted particularly for use as a position indicator under which condition the movement of the movable conductor 56 relative to the fixed conductor 54 is effected by mechanical operation of a shaft 57 or other type of linkage connected to equipment, whose position is to be indicated, external to the telemetering circuit including said transmitting means 55. The shaft 57 may operate through a liquid-tight packing gland 59. The dial of the indicator 58 will in this case be calibrated in terms of the positioning desired to be indicated, the dial containing suitable indicia indicating the limiting positions, intermediate positions, and degrees of movement between the limiting positions, as desired.

The current responsive indicator means illustrated may be either of the type which gives an indication proportional to current or of the type which gives an indication proportional to voltage. Necessarily, due to the particular circuit arrangements, the indicator means of Figures 1, 2, 5 and 6 will be of the former type while the indicator means of Figures 3 and 4 will be of the latter type. Any suitable indicator means of these types may be employed as, for instance, an electrodynamometer of the type such as is shown in the "Elements of Electrical Engineering" by Arthur L. Cook, second edition, page 259, or a permanent magnet D'Arsonoval type of direct current instrument such as illustrated for example in Figure 35, page 47, of the same publication, with suitable current rectifying means.

It is important to note that the source of current applied in each of the telemetering circuits of the remote indicating systems herein disclosed is an alternating current source. The use of alternating current avoids electrolytic action on the liquid and solid conductors and consequent decomposition of the same which would otherwise occur if direct current were employed in the systems.

While Figures 3 and 4 illustrate the use of a Wheatstone bridge electrical circuit it is not intended that the scope of the invention shall be limited to the specific circuits there illustrated since ratiometer and potentiometer circuits and various other types of electrical bridge circuits may also be used.

It was mentioned above that when the remote indicating system of the invention is to be used in applications other than temperature indicators where it is not desired to have the liquid conductor in the transmitter affected by ambient temperatures, a liquid conductor should be used which is subject to minimum change in resistivity (or conductivity) with change in temperature; in other words, a liquid having a relatively small temperature coefficient of change of conductivity. It is additionally desired to employ a liquid conductor having the following characteristics: a freezing point sufficiently low that said liquid conductor will not freeze at arctic temperatures; a boiling point sufficiently high that the liquid will not boil at the high temperatures encountered in engine nacelles; stability under operating conditions; freedom from corrosive action; and a relatively small rate of change of viscosity with temperature. The foregoing characteristics of the liquid conductor are important to insure stability of operation and accurate indication for the purposes of such applications as in a transmitter for use in a remote indicating system designed to be employed in aircraft for indication of oil pressure or fuel level or indication of the position of aircraft control surfaces, landing gear position and like applications.

Liquids embodying the foregoing characteristics, which have been found to be satisfactory for use as a liquid conductor, comprise high-boiling point, low-freezing point, slightly conducting polar organic compounds of the type of alcohols, ketones, glycols, glycol ethers, polyglycol ethers, sulfones, esters, or other polar organic compounds of the type mentioned. Since most of the organic compounds of the type mentioned are characteristically of low electrical conductivity, it is usually desirable to add an electrolyte to such compounds to improve their conductivity characteristic. Therefore, the liquids which have been found to be most satisfactory in use for the purpose of the liquid conductor preferably comprise a polar organic compound of the type mentioned in combination with an organic or inorganic electrolyte which is soluble to a sufficient extent in the liquid.

More specific examples of polar organic compounds of the type mentioned, which have been found to be satisfactory for use as the liquid conductor, include the following: ethyl alcohol, methyl alcohol, propyl alcohol, butyl alcohol, ethylene glycol, diethylene glycol, propylene glycol, hexaethylene glycol, tetraethylene glycol, and other polyethylene glycols, methoxy-methoxy ethanol; ethylene glycol monobutyl ether having the formula $C_4H_9OCH_2CH_2OH$ as for example embodied in the commercial product marketed under the trade name Butyl "Cellosolve"; acetone; ethylene glycol monethyl ether having the formula $C_2H_5OCH_2CH_2OH$ as for example embodied in the commercial product marketed under the trade name "Cellosolve."

Electrolytes which have been found satisfactory for use with liquid organic compounds of the types above mentioned include ammonium phosphate, potassium phosphate, ethanolamine phosphates, amyl, diamyl and triamyl amines, triethanolamine phosphate, butyl amine phosphates, sulfates, chlorides and salts of organic acids. By using varying quantities of the free acid corresponding to the anion used it is possible to adjust the pH value and consequently to control the hydrogen ion activity to achieve a desired conductivity. Instead of the electrolytes mentioned, small quantities of water added to the polar organic solution have been found to improve the operating characteristics of the same by increasing the conductivity thereof; or water, together with one of the electrolytes mentioned may be added to the polar organic compound or compounds.

Especially desirable electrolytes for addition to the polar organic compound include phosphoric acid and salts of phosphoric acid, since in the use of the latter electrolytes relatively little corrosion is encountered and good stability obtained over a wide temperature range. The concentration of electrolyte may vary widely, but in general it may be stated that a concentration of electrolyte comprising 0.01 percent to five percent by weight of the liquid conductor has been found to be satisfactory.

To obtain adequate low temperature properties for the liquid conductor, it is sometimes advantageous to prepare mixtures of two or more of the polar organic compounds of the types above mentioned since such mixtures usually have a lower freezing point than any of the individual constituents.

It will be understood from the foregoing that a satisfactory liquid conductor for the purposes of the invention for use in applications where it is desired not to have the liquid conductor affected by ambient temperatures may, according to the disclosure herein, comprise a single polar organic compound of the type mentioned, alone; or such liquid conductor may comprise a mixture of two or more of the polar organic compounds of the type mentioned; or said liquid conductor may comprise one or more of said polar organic compounds in combination with an electrolyte of the type mentioned hereinbefore.

It will be understood, of course, that where an electric bridge circuit is employed incorporating two arms of a normally balanced electrical bridge within the liquid conductor, in such a manner that any change in the resistance of the liquid conductor affects two arms of the bridge in the same way, the effects of change in resistance of the liquid conductor due to changes in temperature will be minimized and such change in resistance of the liquid conductor will not materially affect the operation of the system where the arrangement is such that two arms of an electrical bridge are similarly affected by such change in resistance of the liquid conductor. However, it is desirable, even where the balanced bridge circuit arrangement is employed, to also use a liquid conductor, having the characteristics above mentioned, to maintain the current in the meter circuit within the range for which the indicating meter was designed.

Now referring to Figure 7, the embodiment of the transmitter, adapted for use in remote indicating systems of the class described, there shown, comprises a housing 65 within which is mounted the Bourdon tube 66, the open end of which is fixed to a hollow post 67, the interior of which constitutes a chamber in communication with the interior of Bourdon tube 66 and also in communication with the fluid pressure conduit 68, said hollow post 67 being fixed to the housing 65. Rotatably mounted on a pin 69 secured to the housing 65 is an arm 70 carrying a movable conductor plate 71 movable intermediate the fixed conductor plates 72 and 73, which fixed conductor plates are secured to the housing 65. The free end of the Bourdon tube is secured to the arm 70 as indicated at 74. The movable conductor 71 is electrically connected with the terminal binding post 75 through the arm 70 composed of conductive material and the lead wire 76. The conductors 72 and 73 are electrically connected to the binding posts 77 and 78, respectively, by lead wires 79 and 80, respectively. The housing 65 comprises a fluid-tight container adapted to be filled with a liquid preferably having the characteristic above mentioned of minimum change in resistivity with change in temperature.

Another embodiment of the transmitter adapted particularly for use in remote indicating systems designed to indicate differential pressures is illustrated in Figures 8 and 8A. Such transmitters are used, for instance, in applications such as fuel pressure gages wherein the difference between the pressure of air introduced to the carburetor and the pressure of fuel introduced to the carburetor is desired to be indicated. The transmitter illustrated in Figures 8 and 8A comprises a housing 90 within which are fixed the pressure-responsive elements 91 and 92 each of which may comprise a bellows. The interior of the bellows 91 communicates with the pressure conduit 93 and the interior of the bellows 92 communicates with the pressure conduit 94. The bellows members 91 and 92 are secured to an inner frame generally designated 95 adapted to be fixed within the housing 90. A beam 96 is pivoted to the inner frame 95 and is provided with adjusting screws 97 and 98 engageable with the inner ends of the bellows members 91 and 92 respectively. The beam 96 has fixed thereto a conductor plate 99 positioned intermediate the fixed conductor plates 100 and 101, said fixed conductor plates being secured to the inner frame 95. Lead wires 102 and 103 connect the fixed conductor plates with respective contact members of a contact plug 104. The movable conductor member 99 is electrically connected also with a contact member of said plug 104 through electrically conductive elements 105, 106 and 107 and lead wire 108. The housing 90 is provided with a liquid filling opening closed by a screw plug 109, through which opening conductive liquid may be introduced into the housing 90 to completely fill the interior thereof immersing the fixed conductors 100 and 101 and the movable conductor 99.

A pair of bellows, only one of which is shown at 110 in Figure 8A, are secured within the housing 90. The interiors of the bellows members 110 are in communication with the atmosphere through portions 110a thereof extending through the housing 90.

In the use of the transmitter illustrated in Figures 8 and 8A, the fluid-tight container 90 is completely filled with conductive liquid and the conductors 99, 100 and 101 connected in a remote indicating circuit such as illustrated in Figures 3 or 4. The arrangement may then be used to remotely indicate differential pressure in an application such as a fuel pressure indicator wherein, for instance, one of the conduits 93 and 94 may have applied thereto the pressure of air being introduced into the carburetor and the other of said conduits may have applied thereto the pressure of fuel being introduced into the carburetor. In operation, any change in the differential pressure will cause the beam 96 to rock around its pivot 111 and thus move the conductor plate 99 relative to the fixed conductor plates 100 and 101 to deflect the indicator such as 13' or 13" of the circuits of Figures 3 or 4. Any change in physical conditions such as temperature or the like, affecting the expansion or contraction of the liquid conductor within the container 90 will be compensated for by the provision of the bellows 110 since upon contraction of the liquid within the container 90 the bellows 110 would be caused to expand by atmospheric pressure or upon expansion of the liquid within the container 90 the bellows 110 will be thereby contracted, so that the liquid pressure within the container 90 is maintained constant and the container completely filled at all times with liquid so that the conductors 99, 100 and 101 are always immersed in the liquid conductor.

Another embodiment of the transmitter is illustrated in Figure 9 comprising a fluid-tight container 120 closed by a screw cover 121 provided with a connection 122 for communication of the interior of the bellows member 123 with a fluid conduit, not shown. The bellows element 123 is secured to the cover 121 and another bellows element 124 is secured to the opposite end of the container 120. An opening is provided in the container 120 for communication of the interior of the bellows 124 with the atmosphere. This opening, as shown in Figure 9, is normally closed by a plug 125. A rod 126 is fixed to the closed ends of the bellows elements 123 facing one another and this rod 126 carries fixed thereto a conductor plate 127 positioned intermediate the fixed conductor plates 128 and 129 secured as shown to the container 120. The plates 128 and 129 are provided with openings 128a and 129a of larger diameter than the rod 126 to permit the latter to pass through said plates out of contact therewith. Suitable electrical connections are provided for connecting the fixed conductor plates 128 and 129 to an external electrical circuit. Likewise any suitable provision may be made for connecting the movable conductor plate 127 to the external electrical circuit, for instance, as by means of a lead from said circuit contacting with the metallic fitting 122 conductively associated with the conductor plate 127 through the metallic bellows 123 and rod 126.

In use, the device of Figure 9 may be connected in any suitable electric circuit such as illustrated by Figure 3 or 4, the container 120 completely filled with a liquid conductor, exteriorly of the bellows elements 123 and 124, and fluid pressure applied to the interior of the bellows 123 through connecting fitting 122 will cause movement of the conductor 127 relative to the fixed conductors 128 and 129 to cause the deflection of the indicator 13' or 13" of Figure 3 or 4. The device of Figure 9 may be employed to indicate absolute pressure by evacuating the bellows 124 and sealing the same by means of the plug 125. When the transmitter of Figure 9 is to be used as an oil pressure transmitter, the bellows 124 may be left open to the atmosphere by drilling a small hole in plug 125. The device of Figure 9 may be used as a differential pressure transmitter in an application such as that described with reference to Figures 8 and 8A. For this purpose fluid pressure communication may be provided with the interior of the bellows 124. For example, if the device is to be used as a fuel pressure indicator the pressure of air being introduced to the carburetor may be applied to one of the bellows 123 or 124 and the pressure of fuel being applied to the carburetor may be applied to the other of said bellows elements.

It will be apparent that the construction of Figure 9 makes provision for compensation for expansion and contraction of the liquid conductor within the housing 121 by the employment of the two bellows elements both of which are similarly affected so as to expand or contract upon expansion or contraction of said liquid whereby to maintain the volume of liquid within the housing 121 constant under all conditions.

Figure 10 illustrates an application of one embodiment of the transmitter of the invention to the remote indication of the position of a control surface of an airplane. In Figure 10 a controllable member such as an airplane aileron, flap, elevator, or the like, is indicated at 130 as being operatively connected by suitable cables or rods 131 to a lever 132 fixed on a shaft 133 connected for rotation through suitable links and levers by a joy stick 134. A lever 135 is fixed on the shaft 133 as is the lever 136. To the lever 135 is pivotably connected a rod 137 to the opposite end of which is fixed a conductor plate 138 located within a suitable fluid container 139 adapted to contain a liquid conductor and a fixed conductor plate 140. The conductor plates 138 and 140 are connected in a remote indicating electrical circuit such as illustrated by Figures 1 to 6 with a power supply and a suitable indicator 141, through the liquid conductor in the container 139 within which liquid conductor the plates 138 and 140 are immersed. The movement of the control surface 130 by the stick 134 will effect the movement of the conductor plate 138 relative to the plate 140 while causing the corresponding deflection of the indicator 141.

From the foregoing it will be seen that the invention provides a remote indicating system and a transmitter for employment in such system which overcome certain disadvantages, hereinbefore mentioned obtaining in previous types of variable resistance remote indicating systems. In connection with the present invention, effects of vibration are minimized by the provision of a liquid conductor intermediate the metallic conductors directly interconnected with the telemetering circuit in that friction due to metal to metal contacts of resistance member and contact member is eliminated; and the liquid intermediate the metal conductors operates to dampen vibration which would otherwise cause an unstable condition of the indicating system. Malfunctioning due to the effects of temperature change are minimized in those applications where it is not desired to have the conductor affected by ambient temperatures, by the use of a liquid conductor having minimum change in resistivity with change in temperature, and also by incorporating two arms of a balanced electrical bridge within the liquid conductor so that both of said arms are equally affected by the consequences of variations in temperature changing resistivity or conductivity of the liquid conductor. Malfunctioning due to expansion and contraction of the liquid conductor is obviated by the provision of compensating means to compensate for such expansion or contraction.

Having thus described my invention, what I claim as new and desire to secure by Letters Patent of the United States is:

1. In a transmitter of the class described, in combination, a fluid container adapted to contain a body of electrically conductive liquid therein, normally spaced electrical conductors in said container and adapted to be immersed in said liquid when the container is filled therewith, a pair of bellows elements in said container, means interconnecting said elements, and means providing communication from the interior of one of said elements to the exterior of said container, one of said conductors being secured to said container, and another of said conductors being secured to said first means for movement relative to said one of said conductors upon change in fluid pressure applied to one of said elements.

2. A transmitter as claimed in claim 1, and means alternatively providing communication from the interior of the other of said elements to the outside of said container or for closing off such communication.

3. A transmitter as claimed in claim 1, wherein the first means comprises a pivoted beam, the ends of which are respectively associated with said elements for movement of the beam thereby.

4. A transmitter as claimed in claim 1, and a bellows elements within said container, the interior of said last element being in communication with the atmosphere, whereby to compensate for expansion and contraction of liquor within said container to maintain the pressure of said liquid constant.

5. In a transmitter of the class described, in combination, a fluid container adapted to contain a body of electrically conductive liquid therein, normally-spaced electrical conductors in said container and adapted to be immersed in said liquid when the container is filled therewith, a pressure responsive element in said container, means providing communication from the interior of said element to the exterior of said container to provide a connection for application of a varying fluid pressure originating outside said container directly to said element, one of said conductors being secured to said container, and another of said conductors being operatively secured to said pressure responsive element for movement relative to said one of said conductors upon change in fluid pressure applied to said pressure responsive element.

6. In a transmitter of the class described, in combination, a fluid container adapted to contain a body of electrically-conductive liquid therein, normally-spaced electrical conductors in said container and adapted to be immersed in said liquid when the container is filled therewith, a pressure responsive element in said container having relatively movable opposite end portions, one of said end portions being secured to a wall of said container and having a passage therethrough providing a connection for application of a varying fluid pressure to said pressure responsive element, one of said conductors being secured in said container in a stationary position with respect thereto, and another of said conductors being movably mounted in said container and actuated by the other end portion of said pressure responsive element for movement relative to said one of said conductors upon change in fluid pressure applied to said pressure responsive element.

7. A transmitter adapted for use in an indicating system, said transmitter comprising a container for a body of electrically-conductive liquid, normally-spaced electrical conductors in said container adapted for continuous immersion in said liquid, a pair of fluid pressure responsive elements in said container, means providing a mechanical connection between movable portions of said elements, means providing communication from the interior of one of said elements for application of a varying fluid pressure thereto, one of said conductors being secured in fixed position in said container, and another of said conductors being connected to said first-named means for movement relative to said one of said conductors upon change in said varying fluid pressure.

8. A transmitter adapted for use in an indicating system, said transmitter comprising a container for a body of electrically-conductive liquid, normally-spaced electrical conductors in said container adapted for continuous immersion in said liquid, a pair of fluid pressure responsive elements having separate connections to sources of fluid pressure, one of said conductors being secured in a fixed position in said container, another of said conductors being carried by a beam fulcrumed in said container, and means connecting each of the fluid pressure responsive elements to the beam respectively at opposite sides of the beam fulcrum.

9. A transmitter adapted for use in an indicating system, said transmitter comprising a container for a body of electrically-conductive liquid, normally-spaced electrical conductors in said container adapted for continuous immersion in said liquid, a Bourdon tube in said container having one end portion secured to a wall of said container, a passage through said end portion providing a connection for application of fluid pressure to said Bourdon tube, one of said conductors being secured in fixed position in said container and another of said conductors being movably mounted in said container and actuated by the free end portion of said Bourdon tube in response to varying fluid pressure applied to said Bourdon tube.

NELSON W. HARTZ.